US012649240B1

(12) United States Patent
Shah

(10) Patent No.: US 12,649,240 B1
(45) Date of Patent: Jun. 9, 2026

(54) AutoWrap ROBOTICS: AI LED PLATFORM FOR AUTOMATED VEHICLE TREATMENT USING HUMANOID ROBOTS

(71) Applicant: Raoul Shah, West Palm Beach, FL (US)

(72) Inventor: Raoul Shah, West Palm Beach, FL (US)

(73) Assignee: AutoWrap Robotics LLC

( * ) Notice: Subject to any disclaimer, the term of this patent is extended or adjusted under 35 U.S.C. 154(b) by 0 days.

(21) Appl. No.: 19/266,236

(22) Filed: Jul. 11, 2025

(51) Int. Cl.
*B25J 9/16* (2006.01)
*B25J 19/00* (2006.01)
(Continued)

(52) U.S. Cl.
CPC .......... *B25J 9/1679* (2013.01); *B25J 9/1697* (2013.01); *B25J 19/0075* (2013.01); *B60S 5/00* (2013.01); *B62D 65/024* (2013.01); *B62D 65/16* (2013.01); *G05B 19/41895* (2013.01); *G05B 2219/40039* (2013.01)

(58) Field of Classification Search
CPC .......................... B25J 19/0075; B25J 19/0079; B25J 19/0083; B25J 19/0087; B25J 19/021; B25J 19/022; B25J 9/1697; B25J 9/1656; B25J 9/163; B25J 9/161; B25J 9/162; B25J 5/007; G05B 2219/40039; G05B 2219/40041; G05B 2219/39173; G05B 19/41805; G05B 19/41895; G05B 2219/50393; G05B 19/41815; G05B 19/4182; G05D 2201/0216; B60S 1/0491; B60S 5/06; B60S 3/008; B62D 65/16; B62D 65/024
See application file for complete search history.

(56) References Cited

U.S. PATENT DOCUMENTS

2005/0267632 A1* 12/2005 Waita ....................... G06T 7/001
700/245
2013/0011234 A1* 1/2013 Pretlove .................... B25J 5/005
701/2
(Continued)

FOREIGN PATENT DOCUMENTS

KR 20230142853 A * 10/2023 ............. G05D 1/248

*Primary Examiner* — Khoi H Tran
*Assistant Examiner* — Tanner L Cullen

(57) ABSTRACT

A robotic vehicle-treatment system includes a robotic platform configured to autonomously position within a constrained vehicle service environment. A sensing system having at least one camera and depth sensor generates a three-dimensional digital model of a vehicle region and surrounding operational space. An artificial-intelligence control system processes the digital model to determine adaptive control commands for robotic motion and tool interaction. A controller coupled to one or more robotic actuators executes the adaptive control commands to manipulate at least one vehicle component associated with a vehicle lighting system. The adaptive control commands dynamically adjust robotic posture, motion path, and operational parameters in response to sensed environmental conditions. The system enables autonomous removal, installation, alignment, restoration, or inspection of vehicle lighting components within interior or exterior vehicle regions under varying environmental conditions.

15 Claims, 5 Drawing Sheets

(51) Int. Cl.

| | |
|---|---|
| *B60S 5/00* | (2006.01) |
| *B62D 65/02* | (2006.01) |
| *B62D 65/16* | (2006.01) |
| *G05B 19/418* | (2006.01) |

(56) References Cited

U.S. PATENT DOCUMENTS

| | | | |
|---|---|---|---|
| 2019/0176482 A1* | 6/2019 | Kerr | B41J 3/4073 |
| 2023/0050932 A1* | 2/2023 | Mark | G01B 21/04 |
| 2023/0123504 A1* | 4/2023 | Paolozzi | B25J 5/02 |
| | | | 15/3 |
| 2023/0182312 A1* | 6/2023 | Kim | B25J 19/023 |
| | | | 700/259 |
| 2023/0191616 A1* | 6/2023 | Krajicek | B25J 19/023 |
| | | | 700/259 |
| 2023/0376014 A1* | 11/2023 | Kane | G05B 19/4184 |
| 2024/0139969 A1* | 5/2024 | Liu | B60S 3/008 |
| 2025/0058469 A1* | 2/2025 | Zhang | B25J 9/162 |

* cited by examiner

402 — Vehicle Interior Preparation & Scanning

404 — Autonomous Headliner Removal & Handling

406 — Precision Starlight LED Fiber Optic Insertion & Securing

408 — Automated Wiring & Connection

410 — Quality Assurance & Post-Installation Verification

AutoWrap ROBOTICS: AI LED PLATFORM FOR AUTOMATED VEHICLE TREATMENT USING HUMANOID ROBOTS

CROSS-REFERENCE TO RELATED APPLICATIONS

This application claims the benefit of U.S. Provisional Patent Application No. 63/837,904, filed on Jul. 3, 2025, the entire disclosure of which is incorporated herein by reference.

FIELD OF THE INVENTION

The present invention relates generally to robotic automation and artificial intelligence software control systems. More specifically, it pertains to a computer-implemented AI software platform configured to autonomously control diverse robotic platforms, including but not limited to humanoid robots, gantry robots, and mobile robots, for the installation, calibration, operation, and servicing (including repair and replacement) of diverse vehicle lighting systems, including interior vehicle roof starlight LED lighting, exterior underbody LED lighting, and functional lighting such as headlights and taillights, whether performed in a dedicated facility or on-site at a customer's location, including via mobile service units.

BACKGROUND OF THE INVENTION

Current State of Automotive Manufacturing and Customization

The automotive industry has historically been at the forefront of automation, particularly in interior manufacturing for high-volume, repetitive tasks. Leading providers like ABB Robotics and Mikron offer advanced robotic cells that streamline processes such as plastic flaming, clipping, screwing, ironing, and textile handling for components like dashboards, central consoles, door panels, and seats. These established solutions have demonstrably improved efficiency, reduced costs, and minimized errors in mass production environments.

However, the modern automotive cabin and overall vehicle aesthetics are undergoing a profound transformation, driven by advancements in autonomous vehicle (AV) and Advanced Driver-Assistance Systems (ADAS) functionalities. Contemporary vehicle interiors are increasingly characterized by intricate electrical equipment and sophisticated electronics, offering a multitude of complex safety and comfort features. This includes highly adjustable seats with integrated heating, massage, and air conditioning, alongside critical safety components like seat occupancy mats linked to airbag systems. Similarly, headliners are evolving to incorporate numerous electrical and electronic components, demanding precise installation and rigorous testing.

Despite the widespread automation in standardized vehicle assembly, a notable gap persists in the automation of highly bespoke, fine aesthetic customizations, such as the installation of starlight headliners and exterior underglow lighting systems, as well as the servicing and replacement of functional vehicle lighting, like headlights and taillights. While mass production processes are highly optimized, these niche, high-precision aesthetic installations and precise servicing tasks largely remain manual or semi-manual. This reliance on human labor for intricate, low-volume additions and repair processes creates a significant bottleneck for scaling luxury customization and efficient vehicle maintenance, thereby limiting production throughput and consistency across vehicles.

Beyond the challenges of in-facility operations, performing these intricate customizations or servicing tasks on-site, such as at a customer's home or a mobile service bay, introduces further complexities. These include navigating unpredictable outdoor environments, dealing with variable lighting and weather conditions, ensuring power availability, managing tools and materials remotely, and maintaining a consistent quality output without a controlled workshop environment. Manual mobile services are often constrained by the ergonomic challenges of performing detailed work in non-ideal settings and the inconsistency inherent in human execution outside of a specialized bay.

The AutoWrap LED Robotics system is specifically designed to address this unaddressed segment, positioning itself to automate currently labor-intensive, high-value customization and servicing processes that are becoming increasingly desired in the evolving automotive market.

Challenges in Manual Starlight LED Headliner Installation

The manual installation of starlight LED headliners is an exceptionally labor-intensive, time-consuming, and intricate process. It typically begins with the prerequisite removal of various interior trim pieces, including pillar covers, sun visors, map lights, dome lights, and roof handles, to gain access to and detach the vehicle's headliner. This initial disassembly phase itself is complex, often requiring specialized tools to prevent damage to delicate components, as evidenced by existing patents for trim removal.

Once the headliner is removed, it must be meticulously prepared. This involves sectioning and marking the headliner surface, often with a grid, to accurately plot the precise locations for individual fiber optic strands. These patterns can be either uniform or randomized, demanding considerable human judgment and precision in their layout.

Subsequently, small holes must be created at each marked point, and individual fiber optic lights are carefully inserted. This step requires a snug fit and precise securing using adhesives like hot glue. The optimal placement of the light source, often a light engine, and the intricate routing of fiber optic cables through vehicle pillars or other concealed pathways are also critical manual steps that affect the final aesthetic and functionality.

The inherent manual nature of this process leads to significant inconsistencies in star placement, variations in brightness, and potential misalignment of the fiber optics, all of which directly impact the final aesthetic quality. The reliance on human fine motor skills, visual judgment, and manual dexterity for tasks like fitting fibers "snugly" and applying "hot glue" means that achieving uniform quality across multiple installations is challenging due to human variability. This creates a precision and repeatability bottleneck, limiting the ability to mass-customize luxury features while maintaining premium quality.

Furthermore, the delicate handling required for fragile fiber optics and the constant risk of damaging surrounding interior components during both disassembly and reassembly are substantial concerns. These challenges clearly highlight a compelling opportunity for robotic automation, where precision, repeatability, and consistent application are inherent advantages, thereby enabling a higher standard of quality and scalability for this niche, high-value market.

Challenges in Manual Underglow LED Installation

The manual installation of underglow LED lighting systems presents its own unique set of challenges. This process typically requires technicians to work in physically demanding and awkward positions, often crawling under vehicles or working with limited space on lifts. Achieving consistent, symmetrical, and aesthetically pleasing placement of LED strips along the vehicle's undercarriage is difficult due to variations in vehicle chassis designs, exhaust routing, and suspension components. Manual application of adhesives or fasteners can lead to inconsistencies in adhesion, durability, and alignment, which directly impact the longevity and visual appeal of the lighting. Furthermore, routing and securing wiring to prevent damage from road debris, water, and heat sources, as well as making proper electrical connections to the vehicle's power system, require significant precision and expertise. The exposure to dirt, grease, and potential hazards of working underneath a vehicle also poses safety and ergonomic concerns for human installers. These challenges underscore the need for an automated solution that can deliver precision, consistency, and safety in underbody lighting installations.

Challenges in Manual Headlight and Taillight Servicing

Manual servicing of headlights and taillights, including replacement, repair, or restoration (e.g., hazing removal), also presents significant challenges. These components are often complex assemblies integrated with sophisticated vehicle systems, requiring precise alignment, careful handling of delicate electrical connectors and seals, and specialized tools for removal and reinstallation. Headlight assemblies can be large and heavy, posing ergonomic challenges during replacement. Restoration of hazy lenses requires consistent application of polishing compounds and precise buffing to achieve uniform clarity without damaging the lens or surrounding paintwork. The variety of vehicle models and assembly methods necessitates extensive technician training and can lead to inconsistencies in quality, potential damage to vehicle bodywork, or improper sealing, resulting in moisture ingress or component failure. Manual diagnostic processes are also time-consuming and prone to human error. These challenges highlight a compelling opportunity for robotic automation to bring precision, efficiency, and consistent quality to this common vehicle maintenance task.

The Growing Demand for Personalized Vehicle Interiors and Exteriors

The market for automotive interior and exterior customization is experiencing robust and sustained growth. The global automotive upholstery market, a key indicator for interior personalization, was valued at USD 7.46 billion in 2024 and is projected to reach USD 11.11 billion by 2033, demonstrating a Compound Annual Growth Rate (CAGR) of 4.50%. This expansion is significantly influenced by a rising emphasis on comfort and ergonomic features within vehicles, with the broader luxury car market anticipated to reach USD 662.3 billion by 2033. More broadly, the car modification market was estimated at USD 91.56 billion in 2023 and is expected to surge to USD 344.0 billion by 2032, exhibiting a CAGR of 6.10%. This growth is primarily driven by a "crescent demand for personalized and customized vehicles," fueled by increasing disposable incomes and a growing consumer interest in automotive aesthetics and performance. Consumers are increasingly seeking to personalize their vehicles and enhance their driving experiences, driving demand for performance upgrades and customization, including both interior and exterior lighting, and high-quality maintenance services for functional components.

The increasing popularity of electric vehicles (EVs) and the ongoing development of autonomous vehicles (AVs) further stimulate this market. EVs and autonomous vehicles commonly feature modern interior layouts and premium materials, creating unique opportunities for innovative car upholstery, advanced seating systems, and integrated exterior lighting. For autonomous vehicles, in particular, the fundamental shift in focus from the act of driving to the in-cabin experience means interiors are evolving to become flexible, modular, interactive, and multisensory spaces. As vehicles become autonomous, the primary value proposition shifts from driving performance to the quality and richness of the in-cabin experience. This makes interior comfort, aesthetics, and personalization paramount. Starlight headliners, as a premium aesthetic feature, perfectly align with this evolving value proposition, contributing directly to the "sensory experience" and "personal space" emphasized for future AV interiors. Similarly, exterior lighting, such as underglow, contributes to the vehicle's unique identity and aesthetic appeal. The efficient servicing of functional lights like headlights and taillights is also critical for safety and vehicle value.

This fundamental transformation in automotive consumer demand and industry focus towards both interior experience, distinctive exterior aesthetics, and streamlined maintenance means that efficient, high-quality customization and servicing at scale will no longer be a niche offering but a critical competitive differentiator for original equipment manufacturers (OEMs) and aftermarket providers.

Furthermore, the increasing desire for convenience drives a parallel demand for mobile, on-site vehicle services. Consumers and fleet managers alike seek high-quality, specialized customization and maintenance without the need to transport vehicles to a fixed facility. The ability to bring advanced robotic capabilities directly to the vehicle, whether in a driveway, a parking lot, or a mobile service bay, represents a significant unmet market need that The AutoWrap LED Robotics system is uniquely positioned to address. The AutoWrap LED Robotics system, by automating complex, high-value customization and servicing tasks, is positioned to capitalize on this significant market shift.

DESCRIPTION OF THE PRIOR ART

Automotive manufacturing has long employed industrial robots for high-volume, repetitive tasks on assembly lines. These robots typically operate within highly structured, caged environments, performing pre-programmed, precise movements on components presented to them in a consistent manner. Examples include spot welding, painting, and basic material handling in well-defined workspaces. Robotic systems from companies such as ABB Robotics, Fanuc, and KUKA are well-established in these applications, demonstrating high throughput and repeatability for standardized production.

In the realm of vehicle customization and maintenance, automation has been more limited. While some specialized robotic cells exist for tasks like plastic flaming or certain interior component assembly, the industry largely relies on manual labor for bespoke, intricate aesthetic modifications and many repair services. For instance, the installation of starlight headliners is predominantly a manual, artisan-driven process, requiring significant human dexterity, judgment, and time. Similarly, aftermarket exterior lighting, such as underglow LED systems, is typically installed by human technicians who manually route wires, secure strips, and make connections, often working in awkward or physically demanding positions underneath vehicles. The servicing and replacement of functional lighting components like headlights and taillights also heavily rely on manual labor, with challenges in precise alignment, delicate electrical handling, and consistent finish quality for lens restoration.

Addressing the Non-Obviousness and Problem-Solution Gap:

The technical problems left unsolved by the prior art, which the present invention uniquely addresses, include:

Inconsistent Quality and Low Throughput in Bespoke Customization: Manual methods for starlight headliner and underglow installations inherently suffer from significant inconsistencies in placement, brightness, alignment, and aesthetic quality across vehicles. They are also exceptionally time-consuming, creating a bottleneck for scaling luxury personalization. Prior industrial automation, designed for mass production of standardized components, lacks the adaptive intelligence and fine motor skills for such bespoke, aesthetic, and low-volume tasks.

High Risk of Damage During Delicate Operations: Manual disassembly of vehicle trim and precise handling of fragile components (like fiber optics, delicate wiring, or intricate headlight assemblies) carry a high risk of scratching, breaking clips, or damaging high-value interior/exterior surfaces. Traditional robotic platforms lack the sophisticated force control and real-time haptic feedback necessary to mitigate these risks.

Limitations of On-Site/Mobile Service in Uncontrolled Environments: Performing intricate customization or servicing tasks at a customer's location introduces significant complexities, including unpredictable environmental factors (variable lighting, uneven terrain, weather), power availability challenges, remote tool/material management, and maintaining consistent quality without a controlled workshop environment. Prior art robotic platforms are ill-suited for such unstructured, variable, and often confined outdoor settings, requiring stable, predefined workspaces.

Inefficient Diagnosis and Lack of Closed-Loop Learning in Maintenance: Manual diagnostic processes for lighting systems are time-consuming and prone to human error, and there's no inherent mechanism for consistent quality assurance data to feed back into an automated improvement loop for repairs.

The present invention, the AutoWrap LED Robotics system, provides novel and non-obvious solutions that overcome these limitations, yielding unexpected and significantly better results than what someone "skilled in the art" would anticipate from merely combining existing technologies:

Novelty in Adaptive Dexterity and Operation in Unstructured Environments: Existing robotic solutions generally lack the multi-modal sensing, adaptive intelligence, human-like dexterity, and flexible locomotion required to operate effectively in the unstructured, variable, and often confined environments of vehicle interiors, underbodies, or exterior component bays within a fixed facility, let alone autonomously adapting to the unpredictable conditions of an outdoor or mobile service location. Traditional industrial robotic platforms are ill-suited for tasks involving delicate material handling, real-time decision-making in response to subtle variations, or dynamic interaction with complex, non-rigid surfaces like vehicle headliners or the intricate contours of an undercarriage or headlight assembly, especially when confronted with environmental factors like uneven terrain, changing light, or ambient weather conditions.

The combination of humanoid, gantry, and mobile robotic platforms controlled by a single, unified AI software platform that dynamically adapts robot posture and mobility to access difficult vehicle areas (e.g., a humanoid crawling under a vehicle or a mobile robot navigating a customer's driveway) is a non-obvious leap beyond fixed-base, caged industrial robotic platforms. This allows for unprecedented on-site mobile service capabilities for complex customization and repair that were previously impossible or highly impractical to automate reliably.

Furthermore, the system's design incorporates and can be augmented by minimal environmental controls within a mobile service unit, such as deployable canopies for rain or portable high-intensity lighting arrays for low-light conditions, to ensure consistent operating environments for even the most delicate tasks when necessary.

Non-Obviousness of AI-Driven Fine Manipulation from Sparse Data: While imitation learning exists, its application in the context of delicate vehicle lighting installation (e.g., fiber optic insertion with millimeter-level precision, or damage-free trim removal), where material properties and geometries vary greatly, is non-obvious. The invention's novel coarse-to-fine trajectory planning algorithms for imitation learning specifically address the challenge of learning nuanced, high-precision tasks from single or few-shot human demonstrations, and then refining these movements to adapt to subtle variations across diverse vehicle models and materials. This capability, combined with active tactile sensing, allows for the unexpected prevention of damage during delicate operations like trim removal or fiber insertion, a problem highly prevalent in manual processes. A skilled artisan might expect to pre-program exact trajectories for rigid components, but not to learn adaptable, compliant motions for deformable materials in varying geometries from minimal human input.

Unexpected Robustness through Multi-Modal Sensing and Dynamic Compensation: The integration of multi-modal vision (3D LiDAR, stereo cameras with dynamic lighting compensation) and force/torque/tactile sensing (with active end-effector sensing), processed by an AI for real-time adaptation to unpredictable environmental variables (e.g., direct sunlight, shadows, uneven ground, temperature fluctuations) for precision manipulation and localization during mobile operations, goes beyond general robotics advancements. The prior art typically assumes controlled lighting and stable environments. The ability to maintain millimeter-level accuracy and consistent quality for starlight installation or headlight alignment in a dimly lit garage or a sun-drenched driveway represents an unexpected and superior outcome compared to current manual limitations or rigid automated systems.

Generative AI for Accelerated Robustness and Scalability: The non-obvious use of Generative AI for creating vast amounts of high-fidelity synthetic training data that simulates diverse vehicle conditions, lighting patterns, and environmental variables for the AI models, vastly accelerates the learning process. This allows the AI to become robust to previously unseen scenarios and new vehicle models without requiring extensive, costly, and time-consuming real-world data collection for every variation. This dramatically reduces the "cold start" problem for new customizations or vehicle types, a significant bottleneck in traditional automation where extensive re-programming or new data sets are required. The unexpected speed and breadth of adaptive learning enabled by this approach is a key differentiator.

Integrated Closed-Loop Learning for Continuous Improvement: The invention's closed-loop learning system, where data from real-time quality assurance checks, detected anomalies, and corrective actions directly feeds back into and refines the AI models over time, leads to continuous self-improvement in precision, efficiency, and error reduction. This goes beyond simple data logging in prior art and creates an autonomously optimizing system. The result is an unexpected and continuously improving quality and efficiency profile for both aesthetic customizations and functional repairs, which is not achievable with manual processes or conventional fixed-program automation.

Comprehensive Problem Solving and Holistic Automation: While individual components of the present invention, such as 3D scanning or certain AI algorithms, may exist in isolation or in other domains, their novel combination and synergistic application within an AI software platform controlling humanoid, gantry, and mobile robotic platforms for autonomous, delicate vehicle lighting customization (starlight, underglow) AND comprehensive functional lighting servicing (headlights, taillights) across both fixed and mobile operational settings addresses a distinct, unfulfilled need in the automotive aftermarket, luxury customization, and repair sectors. This holistic automation, delivering consistent, high-quality, and rapid service in previously unaddressed, complex, and variable environments, is non-obvious and yields a commercially significant advantage.

SUMMARY OF THE INVENTION

Overview of the AutoWrap LED Robotics System

The AutoWrap LED Robotics system represents a groundbreaking, autonomous solution specifically engineered for the precise and efficient installation, calibration, operation, and servicing (including repair, restoration, and replacement) of diverse vehicle lighting systems. This includes, but is not limited to, interior vehicle roof starlight LED lighting, exterior underbody LED lighting, and functional lighting components such as headlights and taillights. This innovative system integrates state-of-the-art robotic platforms (including humanoid robots, gantry robots, and mobile robots), advanced artificial intelligence (AI) and machine learning (ML) algorithms, sophisticated vision and tactile sensing, and highly specialized end-effectors. Its primary objective is to fully automate tasks traditionally performed manually, which are characterized by their complexity, delicacy, and demand for high precision, whether performed within a fixed service bay or directly at a customer's location via mobile deployment.

The system is meticulously designed to operate effectively within the inherently complex and often confined geometries of diverse vehicle interiors, the challenging, varied contours of vehicle underbodies, and the intricate assemblies of functional lighting bays, while also adapting to the dynamic and unpredictable conditions of outdoor or remote environments, ensuring consistent, high-quality, and customizable aesthetic outcomes, as well as reliable functional performance, that meet the exacting standards of the luxury automotive market and broader vehicle maintenance needs. This transformative solution targets both Original Equipment Manufacturers (OEMs) for integrated vehicle production and aftermarket providers for customization and maintenance services.

Key Innovations and Advantages

The AutoWrap LED Robotics system offers a compelling suite of innovations and advantages that address the limitations of manual vehicle lighting installation and servicing, positioning it as a transformative solution for automotive customization and repair.

Enhanced Precision and Quality

By employing advanced robotic manipulation capabilities, the AutoWrap LED Robotics system achieves millimeter-level accuracy in component placement (e.g., fiber optic, LED strip, headlight/taillight assembly), significantly surpassing the consistency achievable through manual labor. This robotic precision inherently leads to a substantial reduction in defects and a marked increase in overall customer satisfaction for both aesthetic and functional lighting installations and servicing.

Increased Throughput and Efficiency

Unlike human operators, robotic platforms are capable of continuous operation, 24 hours a day, 7 days a week, without requiring breaks, vacations, or shift changes. This maximizes production uptime and equipment utilization, resulting in significant increases in production speed and throughput for various lighting projects and servicing tasks. Such automation effectively addresses labor shortages and enables manufacturers and service centers to meet higher output demands, and significantly expands service reach through mobile, on-site capabilities.

The system is designed to complete any service within 6 hours, or through multi-robot or human-robot collaboration, achieve same-day completion for even the most complex installations.

Adaptive Learning and Customization

The system's intelligence is powered by advanced AI, including machine learning, natural language processing, and generative AI. This allows the robotic platforms to learn complex tasks through observation, voice commands, or direct human interaction, significantly reducing the need for extensive manual reprogramming. This adaptive capability is crucial for handling the inherent variability across diverse vehicle models, varying headliner geometries, complex underbody contours, personalized lighting patterns, and the specific requirements for different headlight/taillight assemblies, thereby catering to the burgeoning demand for bespoke interiors and exteriors, and efficient, high-quality functional servicing, even adapting to unpredictable environmental conditions encountered in mobile or on-site deployments (e.g., variable lighting, uneven ground, ambient temperature fluctuations).

The unique application of proprietary real-world 3D scan data and synthetically generated training data (using GenAI) for specific vehicle models, trim types, and lighting patterns ensures the AI's robustness and scalability across an ever-expanding fleet and range of customization requests.

Safety and Human-Robot Collaboration

Equipped with sophisticated force control architecture and advanced sensors, the AutoWrap LED Robotics robotic platforms are designed to work safely alongside human operators. This reduces ergonomic injuries associated with repetitive or heavy tasks, or awkward working positions (such as crawling under a car or lifting heavy headlight units), and minimizes human exposure to potentially hazardous environments. The system incorporates real-time collision detection and adheres to stringent safety protocols, including safety-rated monitored stops, which are further enhanced for operation in less controlled outdoor or public environments to ensure comprehensive safety for all bystanders and property.

This enables seamless 'team mate collab' where human workers can supervise or handle higher-level cognitive tasks while robotic platforms manage the intricate, physically demanding aspects.

Cost Reduction and Return on Investment (ROI)

While the initial capital investment in advanced robotics can be substantial, with manufacturing costs for humanoid robots ranging from $30,000 to $150,000 per unit and high upfront costs for implementation, the economic benefits offered by The AutoWrap LED Robotics system are compelling. These include significant labor cost reductions, estimated at 22-28% within the first year for humanoid robot implementations, and substantial productivity improvements, averaging 30-35% with some achieving up to 50% gains. Such efficiencies lead to a shrinking ROI period, with manufacturers implementing advanced robotics, including humanoids, seeing ROI periods reduce from 5.3 years in 2019 to 2.8 years in 2023.

The AutoWrap LED Robotics system represents a strategic decision to invest heavily in automating niche, complex, and high-margin processes and essential servicing tasks. The rapid return on investment, even with high initial capital outlay, indicates that the long-term gains in quality consistency, production speed, and labor efficiency for premium customization and reliable functional repair justify the investment. This points to a significant shift in manufacturing automation strategy within the luxury automotive sector and aftermarket service industry, moving beyond mere cost-cutting in mass production to enabling and scaling premium, bespoke offerings and efficient, high-quality repairs that command higher prices and differentiate brands and service centers.

The system transforms manual bottlenecks into a substantial competitive advantage, further amplified by the ability to offer convenient, on-site services directly to customers, significantly expanding market reach and revenue streams. Beyond these, the system's precision reduces material waste, facilitates faster inventory turnover for specialized parts, and minimizes warranty claims due to consistent, high-quality output, thereby increasing overall customer throughput and enabling new service revenue streams not feasible with manual methods.

Importantly, the invention encompasses only the software control system interfacing with existing robotic hardware platforms, not the hardware robotic platforms themselves.

DETAILED DESCRIPTION OF THE INVENTION

System Architecture

Figure 3:
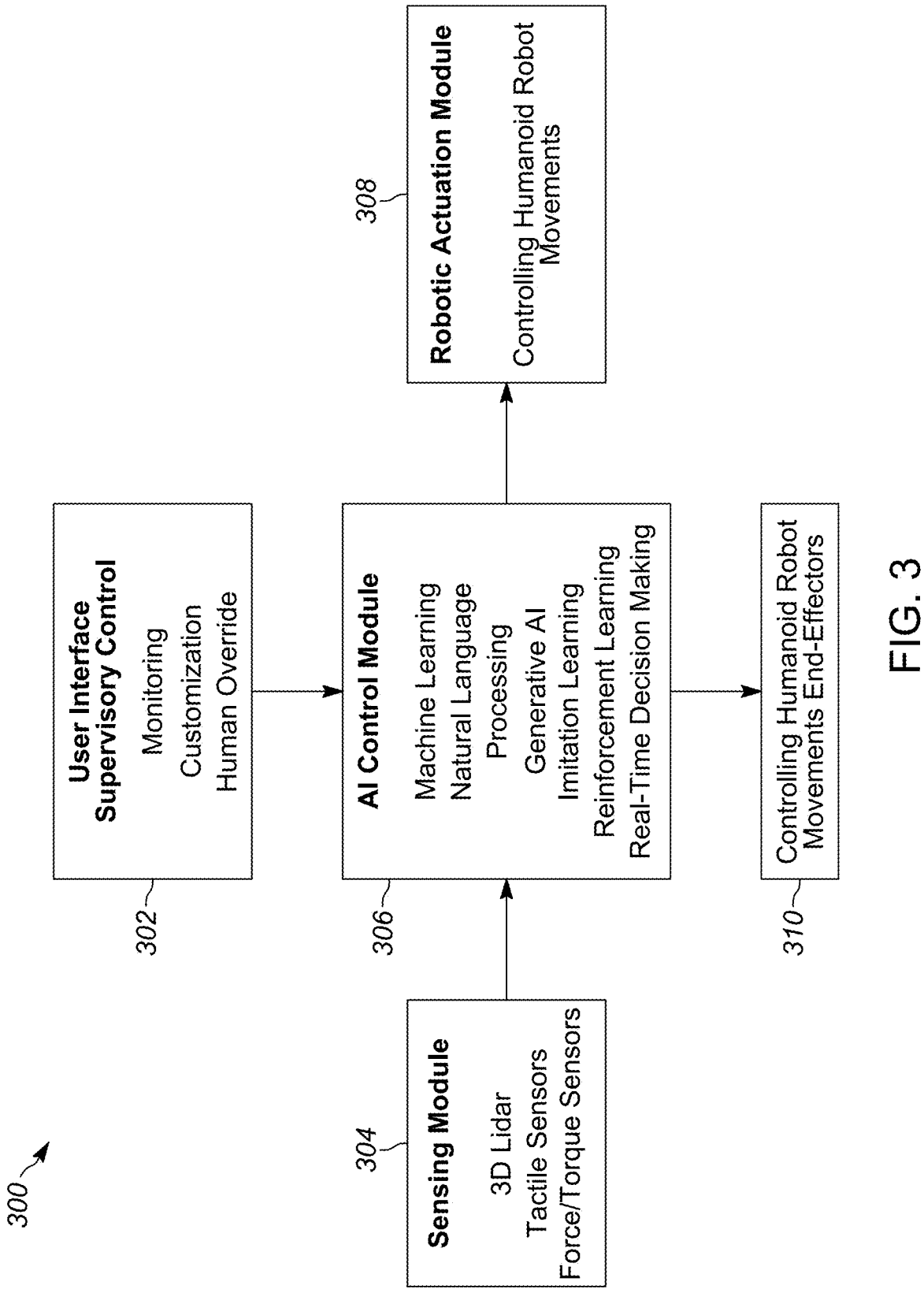
FIG. 3 illustrates the system architecture (300) of the AutoWrap LED Robotics system. It shows a User Interface for Supervisory Control (302), which allows Monitoring, Customization, and Human Override. A Sensing Module (304) incorporates 3D LiDAR (304, 43), Tactile Sensors (304, 44), and Force/Torque Sensors (304, 44). Data from the Sensing Module (304) feeds into an AI Control Module (306), which includes Machine Learning (306, 47), Natural Language Processing (306, 47), Generative AI (306, 47), Imitation Learning (306, 48), Reinforcement Learning (306, 48), and Real-Time Decision Making (306, 49). The AI Control Module (306) then directs a Robotic Actuation Module (308) for Controlling Humanoid Robot Movements (308, 52) and Controlling Humanoid Robot Movements End-Effector (310, 54). This figure details the interconnected modules that enable the robot's autonomous operation, including its robust adaptability to varied environmental conditions and mobile deployment.

The AutoWrap LED Robotics system is built upon a sophisticated architecture that integrates cutting-edge robotics, sensing, and artificial intelligence to perform the intricate tasks of installing and servicing diverse vehicle lighting systems. This architecture ensures highly precise, adaptive, and autonomous operation across varied vehicle models and lighting types, and is designed to function robustly in both controlled facility environments and uncontrolled, dynamic on-site or mobile deployment settings. The system comprises a Robotic Platform, Specialized End-Effector and Tooling, Multi-Modal Vision and Tactile Sensing Systems, and AI-Powered Control and Navigation Modules. This architecture is generally represented in FIG. 3 (300).

Robotic Platform

The primary robotic platform for the AutoWrap LED Robotics system will be an advanced humanoid robot (102) (e.g., humanoid robot 102 in FIG. 1), a highly dexterous mobile robot, or a precise gantry robot system. Different robotic platforms are well-suited for this application due to their inherent capabilities.

Humanoid robots (e.g., Apptronik's Apollo, Agility Robotics' Digit, Figure AI (FIG. 02), or Tesla (Optimus)) excel with their human-like dexterity and adaptable form factor, allowing bipedal locomotion for independent navigation and dynamic posture adjustment (e.g., crawling or lying down for underbody access), even on varied outdoor terrains or within confined customer garages. These humanoid platforms are specifically chosen for their high payload capacity for carrying various end-effectors, long battery life for extended operations, and inherent robustness to varied environmental conditions like extreme heat, humidity, and dust common in mobile service environments. For optimal performance in dynamic outdoor settings, the system is designed to integrate with or be augmented by minimal environmental controls within a mobile service unit, such as deployable canopies for rain or portable high-intensity lighting arrays for very dark conditions, ensuring a consistent operating environment when necessary. Their ability to autonomously transport or deploy from a mobile service unit extends the system's reach.

Mobile robotic platforms can provide flexible positioning around the vehicle and potentially navigate larger shop floors or serve as the core mobility component of a mobile service unit, transporting tools and materials directly to the vehicle.

Gantry robotic platforms can offer high precision and reach over a vehicle, particularly beneficial for overhead tasks like interior headliner work or if the vehicle is elevated on a lift, and can be integrated into fixed bays or deployable structures for mobile operations. Their advanced manipulation capabilities, whether multi-DoF hands (106) (e.g., hands 106 in FIG. 1) on humanoids or specialized end-effectors on gantry/mobile arms, are crucial for intricate manipulation of small, delicate components like fiber optics, and for securely attaching and routing flexible LED light strips, or precisely handling and aligning headlight and taillight assemblies.

These diverse capabilities enable the system to operate effectively within the inherently complex and often confined geometries of diverse vehicle interiors, the challenging, varied contours of vehicle underbodies, and the intricate, precise bays for functional lighting components, regardless of the specific operational environment or physical constraints of a fixed facility or an on-site deployment.

End-Effector and Specialized Tooling for Lighting Handling

The AutoWrap LED Robotics system will incorporate a suite of specialized, interchangeable end-effectors meticulously designed for the delicate and precise handling of various lighting components and associated vehicle parts. This includes a range of tools for:

Fiber Optic Manipulation: Miniature grippers with compliant surfaces for handling individual fiber optic strands (typically 0.75 mm to 1.5 mm diameter) without damage, ensuring precise insertion and securing. These grippers feature piezoelectric force sensors integrated into their fingertips that provide active sensing capabilities to detect exact insertion resistance (e.g., within +0.05 N accuracy) and adjust gripping force and insertion speed in real-time. The gripper's internal mechanism employs a micro-servo motor for precise closure control, ensuring a snug yet non-damaging fit into pre-drilled holes.

LED Strip Application: Automated adhesive applicators (e.g., hot glue, UV-cured adhesive, pressure-sensitive tape dispensers) integrated with rollers or presses for secure, uniform application of flexible LED strips. The applicator includes a precision volumetric pump for adhesive flow control (e.g., ±0.01 ml accuracy) and a thermistor for temperature regulation (±1° C.) to ensure optimal curing and adhesion. The rollers apply uniform pressure (e.g., 10-50 kPa) as dictated by the AI.

Fastening Devices: Automated screwdrivers with torque control feedback (e.g., ±0.01 Nm accuracy), rivet guns with depth control, or clip placement tools for mechanical attachment of lighting components or wiring conduits, ensuring robust installation without overtightening or damaging fasteners.

Trim Removal/Reinstallation: Specialized plastic pry tools (110) (e.g., tool 110 in FIG. 1), leverage tools, and clip removers, designed with compliant edges and integrated miniature force sensors (e.g., strain gauge-based) to detect impending material stress and minimize damage during disassembly and reassembly processes. The AI control module's force control architecture directly utilizes this feedback to prevent excessive force application.

Wire Routing and Connection: Tools for precise wire stripping (e.g., laser wire stripping for delicate insulation), terminal crimping (with crimp force monitoring), and making secure electrical connections, including fuse taps or quick connectors, adhering to automotive wiring standards.

Headlight/Taillight Servicing Tools: Specialized grippers for handling large, sometimes heavy, headlight/taillight assemblies; precision alignment tools that use integrated cameras and fiducial markers for sub-millimeter positioning accuracy; and polishing/buffing end-effectors with programmable pressure and rotational speed control for consistent lens restoration without damaging the lens or surrounding paintwork.

Additionally, the system's end-effectors are designed to apply post-cleaning protection and finishing layers, such as ceramic sealants, spray waxes, or interior fabric protectants, enabling service upsells and enhancing vehicle longevity, thereby leveraging its precision application capabilities for a comprehensive finishing treatment.

These end-effectors are engineered to facilitate fine manipulation, and can learn novel tasks from single human demonstrations through imitation learning, enabling the robotic platform to replicate nuanced movements.

The specialized tooling serves as the critical interface that translates the robotic platform's general dexterity into the specific, fine motor skills required for precise component insertion, attachment, wiring, and servicing of complex lighting assemblies.

A novel and highly efficient autonomous tool-changing mechanism allows the robotic platform to seamlessly and rapidly switch between dozens of these specialized tools. This mechanism employs a quick-release pneumatic or electromagnetic coupling system, controlled by the robotic platform's central processing unit, capable of tool changes in less than 5 seconds.

The complexity of designing and integrating this adaptive tooling with the robotic platform's control system represents a significant engineering challenge and a key area of intellectual property.

Furthermore, the system includes an automated tool management and maintenance subsystem that tracks tool usage, performs automated cleaning and recalibration of end-effectors (e.g., verifying gripper jaw alignment, polishing pad integrity), and alerts human operators for replacement or advanced servicing, minimizing downtime and ensuring consistent performance.

The design of these specialized end-effectors prioritizes ease of manufacturing and supply chain scalability to support large-scale commercial deployment, and are subject to periodic or condition-based self-calibration routines to maintain accuracy and prevent drift over time.

Vision and Tactile Sensing Systems

The AutoWrap LED Robotics system relies heavily on advanced multi-modal sensing systems (Sensing Module 304 in FIG. 3) for comprehensive environmental understanding and precise task execution, particularly vital for adapting to the unpredictable conditions of outdoor or on-site deployments.

3D Vision Systems:

High-resolution 3D LiDAR sensors (304, 43) (e.g., RealSense L515, achieving ±2 mm depth accuracy at 3 m) and stereo cameras (e.g., with 1280×720 resolution per eye) provide dense 3D point clouds and egocentric visual representations of the vehicle interior and underbody, as well as the surrounding operational environment. This data is used for:

Accurate mapping of complex and varying interior geometries (e.g., headliner contours, pillar shapes) to create a dynamic digital twin updated at 30 Hz.

Precise digital model generation of the vehicle's underbody, including chassis elements, exhaust routing, and potential obstacles.

Real-time localization and simultaneous localization and mapping (SLAM) within the workspace, enabling dynamic navigation and precise component positioning without extensive external calibration, even on uneven outdoor terrain or in variable lighting conditions.

The system utilizes a visual-inertial odometry (VIO) pipeline that fuses camera data with IMU readings for robust pose estimation, even during temporary sensor occlusions.

The vision system incorporates dynamic lighting compensation algorithms. These algorithms utilize a combination of automatic exposure control, high dynamic range (HDR) imaging, and multi-spectral imaging to analyze ambient light conditions (e.g., direct sunlight, shadows, low-light garages). Based on this analysis, the AI adjusts image processing parameters (e.g., gain, white balance, contrast enhancement) to ensure consistent feature extraction and object recognition for the robotic actions. For instance, in direct sunlight, algorithms enhance edge detection to prevent feature washout, and in low-light, noise reduction filters are applied to maintain clarity for precise fiber optic insertion.

Object recognition and pose estimation are employed to identify trim pieces, wiring harnesses, lighting component attachment points, and specific mounting points/connectors for headlights/taillights, even amidst variations, and adapting to environmental occlusions or background clutter inherent in uncontrolled settings. The AI uses deep learning-based object detectors (e.g., YOLOv8 or DETR-based architectures) trained on both real and synthetic data for robust recognition across varying conditions.

Tactile Sensors:

Integrated tactile sensor arrays (Tactile Sensors 304, 44), particularly palm-sized units on the robotic platform's hands and end-effectors (e.g., using elastomeric skins with embedded micro-force sensors), provide crucial haptic feedback. This enables:

Robust object recognition and precise grasping of components with varying textures and compliance.

The AI uses tactile feedback to refine grasp force in real-time, preventing crushing of delicate components while ensuring secure hold.

Verification of component seating and secure attachment (e.g., ensuring a fiber optic is snugly inserted, or an LED strip is fully adhered, or a headlight assembly is correctly seated and aligned). For example, a force threshold detected by the tactile sensor after insertion confirms proper seating of a fiber optic.

Detection of unexpected contact with delicate surfaces or components to prevent damage. This is augmented by active sensing within end-effectors (as described in herein to gauge precise pressure and prevent material deformation.

Force/Torque Sensors:

Force/torque sensors (Force/Torque Sensors 304, 44) embedded at the robotic platform's wrists or joints (e.g., 6-axis F/T sensors like ATI Axia80, providing ±0.1 N force resolution) are essential for real-time force control and impedance control. This allows the robotic platform to:

Interact safely and compliantly with delicate interior components (e.g., headliner fabric, plastic trim) and fragile lighting components. The impedance control architecture dynamically adjusts the robotic platform's stiffness and damping based on sensed contact, ensuring gentle interaction. For instance, when applying an LED strip, the robotic platform can maintain a constant, desired pressure against a curved surface while adapting to small surface irregularities.

Apply precise and controlled forces during insertion, attachment, and wiring steps, preventing material deformation or damage. The AI control module's planning module generates target force profiles for each manipulation, and the force control loop tracks these profiles with high fidelity.

Enable safe human-robot collaboration by detecting and reacting to unexpected contact with human operators, adhering to safety standards like ISO/TS 15066. Upon detecting a predefined force threshold (e.g., 150 N), the system triggers a safety-rated monitored stop (SRMS) within milliseconds.

The combination of visual, haptic (tactile), and force feedback creates a robust perception and interaction system that allows the robotic platform to adapt to real-world variability and delicate material properties, moving beyond the limitations of traditional industrial automation.

The sensing-to-action loop involves:

(2) Data is pre-processed and filtered;

(1) Raw sensor data (3D point clouds, images, force/torque, tactile) is ingested;

(3) AI perception modules (e.g., deep learning models) interpret this data to identify objects, estimate poses, and build a real-time environmental map;

(4) The AI control module (e.g., a hybrid classical control and reinforcement learning approach) synthesizes this perception with the task plan to generate immediate motion commands (joint angles, end-effector velocities, desired forces);

(5) These commands are sent to the robotic platform's low-level controllers for execution, with continuous feedback loops ensuring desired outcomes are achieved while adapting to dynamic changes.

Integrated sensors within the robotic platform's systems are subject to self-calibration routines and automated drift management protocols, leveraging known environmental fiducials or factory-calibrated reference points to ensure sustained accuracy over extended operation, particularly crucial for precision tasks in varied environmental conditions.

AI-Powered Control and Navigation Modules

The core intelligence of the AutoWrap LED Robotics system will be driven by advanced AI-powered control modules (AI Control Module 306 in FIG. 3), leveraging a combination of machine learning (ML) (306, 47), natural language processing (NLP) (306, 47), and generative AI (GenAI) (306, 47). This sophisticated software platform enables the robotic platform's advanced capabilities.

Adaptive Learning:

The system learns complex tasks through various paradigms:

Imitation Learning (306, 48): Robotic platforms learn novel manipulation tasks directly from human demonstrations. This is particularly critical for teaching the nuanced, fine motor skills required for fiber optic insertion, delicate wire routing, or the precise sequence for removing, installing, or restoring headlight/taillight assemblies. The system employs novel algorithms for coarse-to-fine trajectory planning capable of learning from single or few-shot demonstrations. This involves an initial "coarse" trajectory captured from a human demonstration (e.g., via kinematic data from a human-worn suit or direct robotic teleoperation). This coarse trajectory is then refined through iterative optimization or local reinforcement learning, using real-time sensor feedback (force/torque, tactile, high-resolution vision) to achieve "fine" adjustments for sub-millimeter precision and compliance.

For example:

For starlight LED installation, the coarse trajectory might define the general path to a marked insertion point on the headliner, while the fine refinement uses tactile feedback to precisely center the fiber optic and apply the correct insertion force without buckling the headliner fabric.

For underglow LED installation, the coarse path follows the vehicle's frame, while fine adjustment uses vision to ensure the strip adheres flush to contoured surfaces and tactile feedback to apply uniform pressure during application.

For headlight assembly replacement, coarse planning navigates the robotic platform to the headlight bay, and fine control, using force sensors, ensures precise alignment of mounting tabs and electrical connectors for a secure, damage-free fit.

The learning process relies on a transformer-based neural network architecture for mapping observed states to robot actions.

Reinforcement Learning (306, 48): RL, potentially combined with unique task decomposition strategies and task-specific reward systems customized for automotive lighting tasks, is used for optimizing complex high-level tasks such as assembly sequences, collision avoidance in dynamic environments, and precise component alignment in unstructured settings.

For example, for starlight installation, task decomposition segments the overall process into sub-tasks: "headliner removal," "hole punching," "fiber insertion," "fiber securing," and "wiring." Each sub-task has a task-specific reward system: "minimal headliner deformation" for removal, "accurate hole diameter and depth" for punching, "successful fiber optic seating with minimal force" for insertion, and "secure adhesion with uniform application" for securing. The RL agent, often using a Proximal Policy Optimization (PPO) or Soft Actor-Critic (SAC) algorithm, is trained in a simulated environment (accelerated by synthetic data) to maximize these cumulative rewards, thereby discovering optimal, robust strategies.

Generative AI (306, 47) & Natural Language Processing (306, 47):

These capabilities enable the robotic platforms to interpret complex instructions, recognize patterns in diverse vehicle data, and generate optimal action sequences, lighting patterns, diagnostic routines, or repair sequences in response to user input (e.g., "Install a swirling starlight pattern," "Apply underglow along the frame rails," or "Replace hazy driver's side headlight assembly").

A key innovation is the system's ability to create vast amounts of high-fidelity synthetic training data through GenAI. This involves using diffusion models or Generative Adversarial Networks (GANs) to synthesize realistic 3D models of vehicle interiors/exteriors with varying trim, damage, and environmental conditions (e.g., different lighting, shadows, dirt levels, rain effects). This synthetic data, augmented with ground truth annotations, is then used to pre-train the AI perception and control models, vastly accelerating the learning process and making the AI robust to previously unseen scenarios. This significantly reduces the need for explicit, step-by-step programming.

Proprietary Data Integration & Feedback:

The system continuously integrates proprietary real-world 3D scan data (from diverse vehicle models and previous installations) with synthetic data to train and refine its AI models. Real-world data is systematically collected via high-resolution sensors on the mobile units (e.g., during scanning or post-installation verification, or through human operator input points for specific edge cases. This data is then securely transmitted, automatically tagged, and meticulously curated and labeled by a dedicated data pipeline to ensure optimal quality and relevance for AI model retraining and continuous improvement.

Furthermore, a closed-loop learning system ensures that data from quality assurance checks (e.g., post-installation scan deviations, detected anomalies, sensor readings during critical operations), and corrective actions directly feeds back into and refines the AI models over time, leading to continuous self-improvement in precision, efficiency, and error reduction. This feedback loop is managed by a centralized data pipeline that automatically tags, preprocesses, and retrains relevant AI modules periodically.

Real-Time Decision-Making (306, 49):

The AI control module continuously processes immediate sensory feedback (vision, tactile, force/torque) to make real-time adjustments to robotic platform actions. This includes adapting to minor variations in material properties, slight misalignments of components, unforeseen obstacles, or variations in underbody contours, existing components, or headlight/taillight mounting conditions, as well as adapting to dynamic environmental changes such as lighting shifts, ambient temperature fluctuations, or minor ground irregularities encountered in mobile deployments.

The AI achieves this through a fast inference engine (e.g., TensorRT-optimized neural networks) running on an embedded GPU (e.g., NVIDIA Jetson platform) on the robotic platform, enabling sub-100 ms response times for critical decision-making.

Error Handling and Robustness Examples:

If a fiber optic insertion encounters unexpected resistance beyond a predefined threshold (e.g., 2N), the system autonomously retracts the end-effector, re-scans the immediate area to identify the obstruction (e.g., a misaligned hole or debris), attempts a localized cleaning/clearance action, and then attempts re-insertion with adjusted force or a slightly perturbed trajectory, logging the event for human review.

If a tool change fails due to debris in the coupling mechanism, the system initiates an automated purge cycle (e.g., high-pressure air blast) and attempts re-engagement, logging the specific error code and potentially flagging the tool for maintenance.

If an unforeseen obstacle (e.g., a child's toy, a pet) is detected in the mobile workspace via LiDAR, the robotic platform initiates an immediate safety stop or re-plans its path to avoid the obstacle, alerting the human supervisor.

The ability of AI-powered robotic platforms to "self-diagnose issues, optimize workflows, and autonomously adapt to new tasks" is critical for maintaining efficiency and quality in a dynamic production environment.

Autonomous Navigation:

Sophisticated navigation algorithms manage autonomous navigation within confined spaces (e.g., vehicle interior, manufacturing facility) and adaptive locomotion or positioning for accessing challenging areas like the vehicle underbody or frontal/rear bays. Crucially, these algorithms are specifically designed and optimized for robust autonomous navigation within external, less controlled environments such as residential driveways, commercial parking lots, or within a mobile service unit's operational zone.

They incorporate advanced environmental perception (e.g., occupancy grid mapping with dynamic obstacle tracking) to handle uneven terrain, unpredictable obstacles, and variable lighting, ensuring precise positioning and safe movement outside of a factory setting. These algorithms can draw inspiration from advancements in ultracompact transport robotic platforms or drones, optimized for tight quarters and complex path planning, utilizing Model Predictive Control (MPC) for smooth and efficient path execution.

On-Device AI:

Crucially, the system can utilize on-device AI models (e.g., optimized for Google DeepMind's Gemini Robotics capabilities or similar embedded inference engines) allowing autonomous robotic platforms to operate without continuous internet connectivity. This enhances reliability and practical deployment in real-world factory environments, and is paramount for robust operation during mobile or on-site deployments where network access may be unreliable or non-existent, improving robustness in dynamic settings.

Integration Details:

The AI software platform communicates with and precisely controls diverse robot kinematics and end-effectors via a standardized robotics middleware interface (e.g., ROS 2). This middleware abstracts the specific hardware details, allowing the AI control module (306) to send high-level commands (e.g., "move end-effector to pose X," "apply force Y," "change tool Z") that are then translated into low-level joint commands by vendor-specific robot drivers. This modular architecture ensures seamless integration with various robot manufacturers' hardware while maintaining precise control across different degrees of freedom and end-effector types. This modularity also facilitates the scalable integration of new robotic platforms from various manufacturers into the existing software control system, allowing for flexible fleet expansion and hardware upgrades.

Cyber-Physical Security & Data Privacy:

Furthermore, the AI control module (306) integrates robust cyber-physical security measures, including secure boot, intrusion detection (e.g., anomaly detection on sensor data and control signals), and encrypted communication channels (e.g., TLS 1.3) between the robotic platform, the local control unit (e.g., within the mobile service unit), and cloud services, safeguarding against unauthorized access or manipulation during mobile and on-site operations.

For data privacy during on-site 3D scanning, the system employs advanced anonymization techniques. This includes real-time detection and blurring/redaction of personally identifiable information (PII) such as license plates, VINs, and faces detected within the vehicle's interior. All raw scan data is immediately processed to remove or anonymize sensitive details at the edge before any transmission or storage in cloud environments. Data storage is in compliance with relevant data protection regulations (e.g., GDPR, CCPA), utilizing secure, encrypted databases with strict access controls. Only anonymized, aggregated, or necessary geometric data is used for AI model training and system improvement, ensuring customer privacy is maintained.

Operational Process

Figure 2:
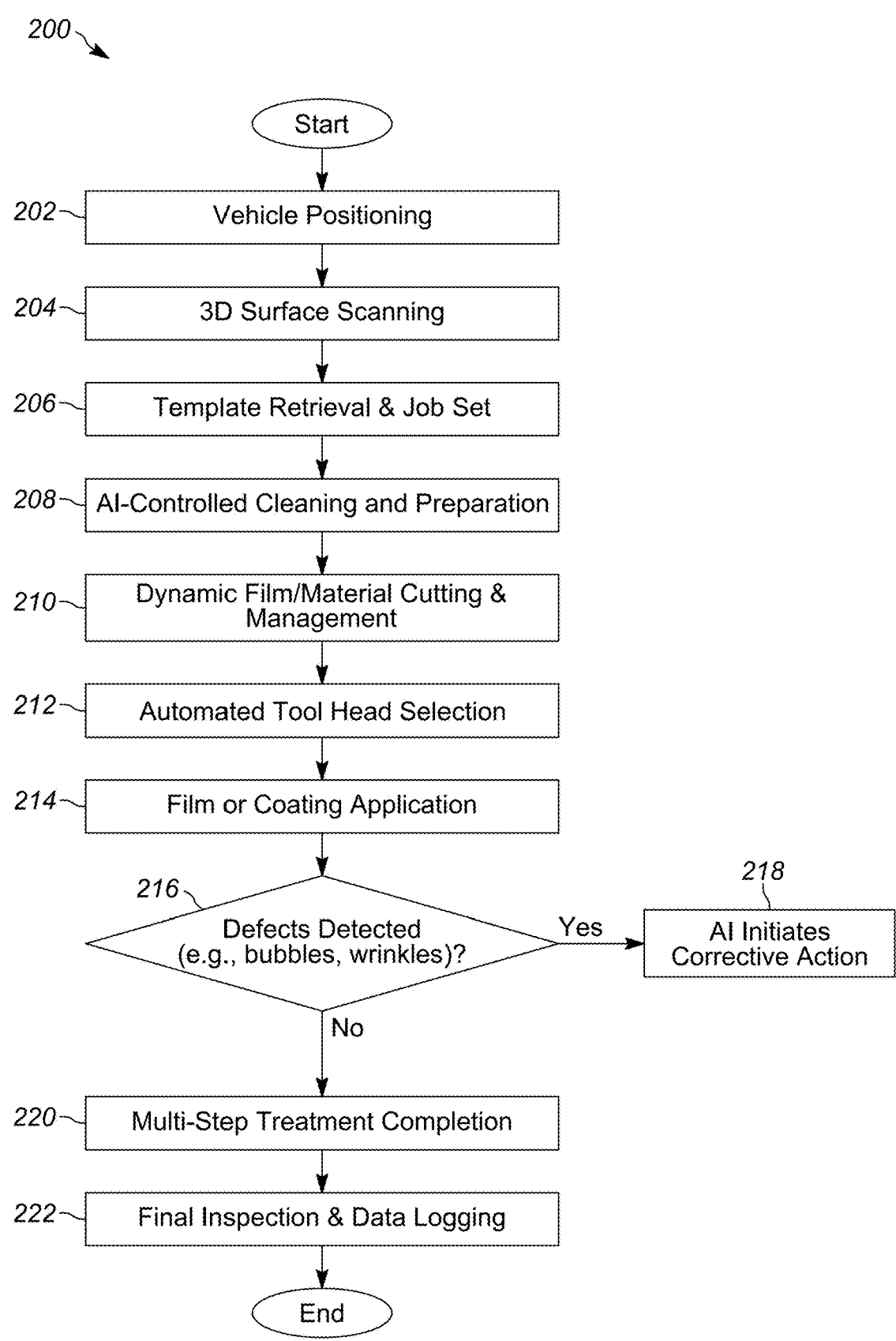
FIG. 2 is a flowchart (200) detailing the process for vehicle surface treatment, which can be adapted for LED installation. The process begins with Vehicle Positioning (202) and 3D Surface Scanning (204). This is followed by Template Retrieval & Job Set (206) and AI-Controlled Cleaning and Preparation (208). The flowchart includes Dynamic Film/Material Cutting & Management (210), Automated Tool Head Selection (212), and Film or Coating Application (214). A decision point checks for Defects Detected (216), which, if present, leads to AI Initiates Corrective Action (218). If no defects, it proceeds to Multi-Step Treatment Completion (220) and Final Inspection & Data Logging (222) before ending. This flowchart outlines the high-level automated workflow, applicable to both fixed facility and mobile on-site operations, with adaptive steps for environmental variations.
Figure 4:
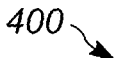
FIG. 4 presents a flowchart (400) specifically outlining the operational process for Starlight LED installation. It begins with Vehicle Interior Preparation & Scanning (402). The next steps are Autonomous Headliner Removal & Handling (404) and Precision Starlight LED Fiber Optic Insertion & Securing (406). Finally, the process includes Automated Wiring & Connection (408) and Quality Assurance & Post-Installation Verification (410). This figure provides a more detailed, sequential view of the interior lighting installation, designed to be performed consistently across diverse operational settings, including on-site customer locations.
Figure 4:
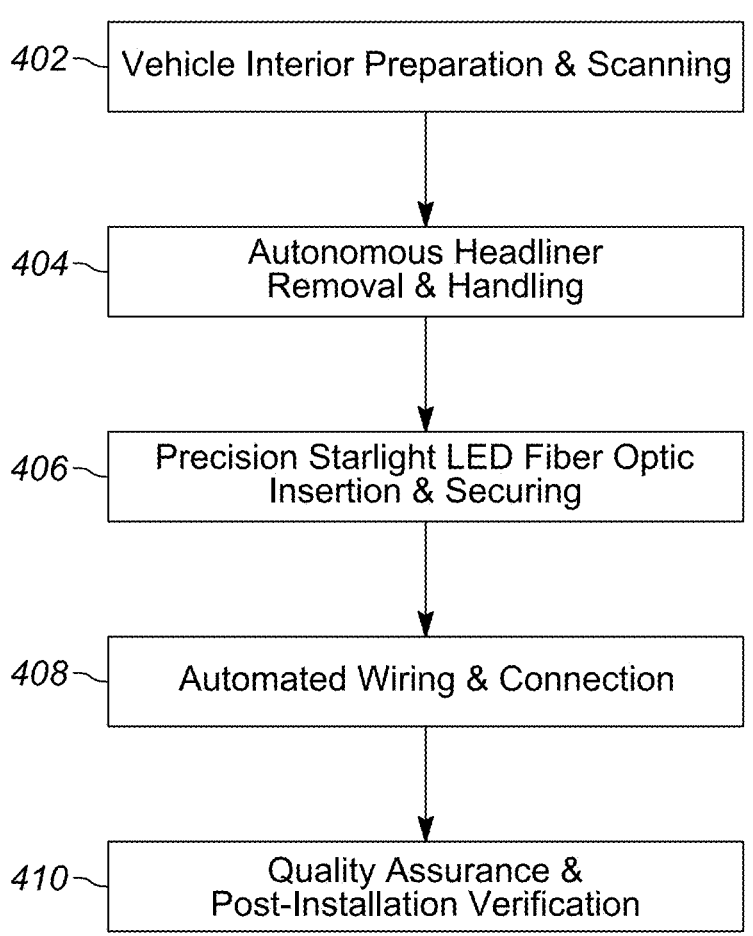

The AutoWrap LED Robotics system executes diverse vehicle lighting installations and servicing tasks through a meticulously orchestrated, multi-stage autonomous operational process (e.g., as shown in FIG. 4 (400) for starlight installation, and adaptable for other lighting services, or generally in FIG. 2 (200)), designed for seamless execution in both fixed facility and mobile/on-site deployment scenarios.

Vehicle Scanning and Preparation

Upon a vehicle's arrival at the AutoWrap LED Robotics station—whether at a fixed facility bay or an external, on-site service location (e.g., customer driveway or mobile service unit operational zone)—an initial high-resolution 3D scan of the vehicle interior and/or exterior surfaces is performed (Vehicle Interior Preparation & Scanning 402 in FIG. 4; 3D Surface Scanning 204 in FIG. 2), based on the lighting service requested. This scan focuses specifically on relevant areas: the headliner (108 in FIG. 1) and surrounding trim for interior lighting; the vehicle's undercarriage for underglow lighting; and the front/rear fascias, wheel wells, and engine bay areas adjacent to headlights/taillights for functional lighting servicing.

The captured data constructs a precise digital twin of the vehicle's unique geometry. This digital twin is critical for:

Identifying specific vehicle model variations

Mapping existing trim configurations and underbody layouts

Detecting lighting assembly types and potential obstacles or anomalies

This enables dynamic adaptation to diverse vehicle models and geometries, while accounting for environmental factors such as ambient lighting, background clutter, and minor ground unevenness encountered in uncontrolled environments.

The system analyzes this scan data to identify and map exact attachment points for all relevant components, leveraging pre-existing knowledge bases, CAD data, and potentially patent information related to vehicle trim attachment/ removal, component layouts, and installation/servicing best practices, accessed via an online database (Template Retrieval & Job Set 206 in FIG. 2).

Autonomous Component Disassembly and Handling

Following scanning and mapping, the robotic platform autonomously identifies and removes any vehicle components obstructing access to the installation or service area (AI-Controlled Cleaning and Preparation 208 in FIG. 2).

Figure 1:
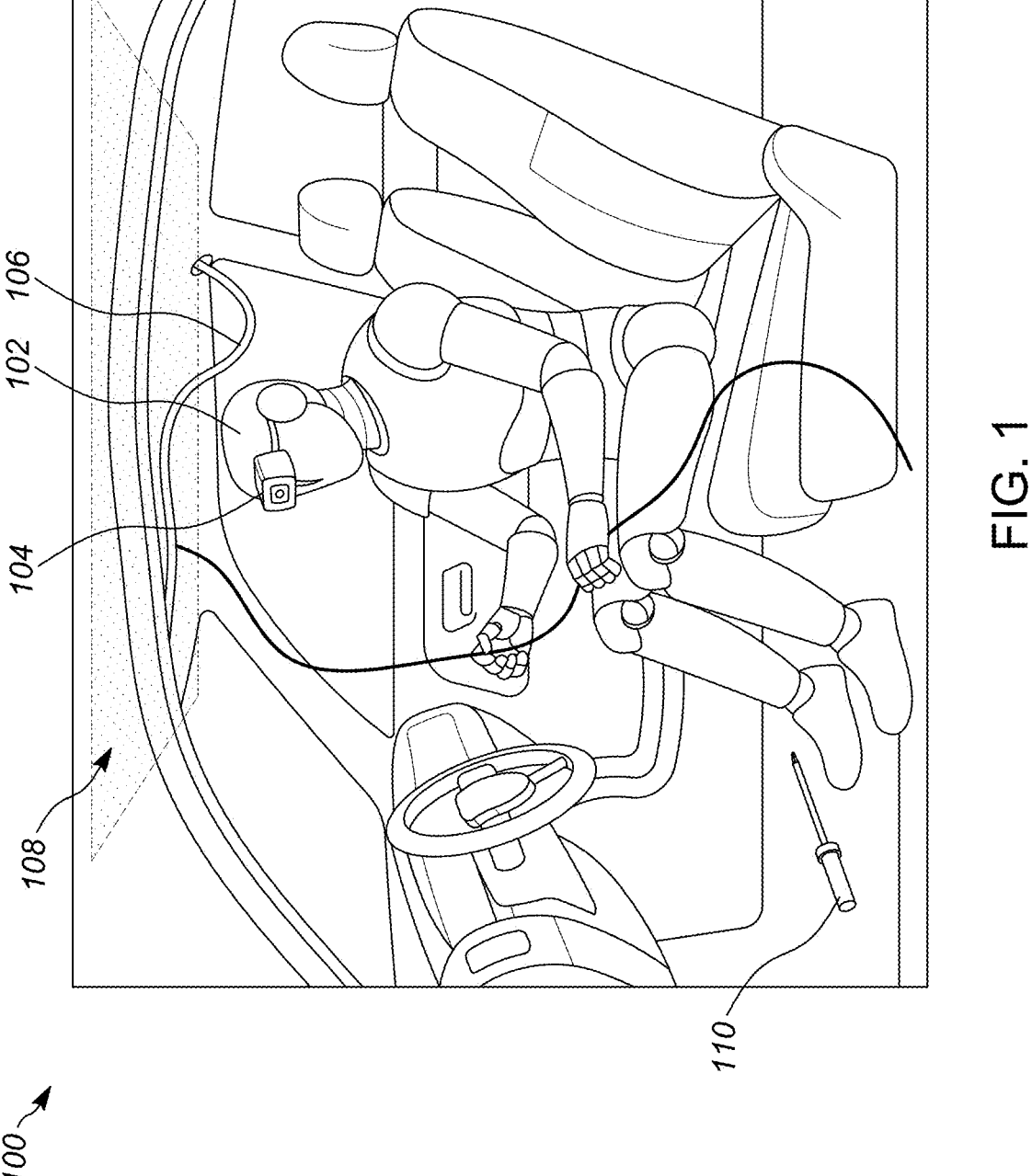
FIG. 1 shows a humanoid robot (102) positioned within a vehicle's interior, appearing to perform a task on the headliner (108). The robot has a head-mounted sensor (104) and is manipulating a component with its hands (106). A tool (110), possibly for trim removal, is also visible near the robot. This figure visually represents the core concept of a humanoid robot operating within a confined vehicle space for tasks like starlight LED installation, and its adaptability to diverse interior configurations regardless of whether the vehicle is in a fixed facility or a mobile service environment.

For Interior Lighting (e.g., starlight):

This involves removing interior trim pieces such as A-pillar covers, C-pillar covers, sun visors, map lights, dome lights, and carefully detaching the headliner (108 in FIG. 1). The process uses specialized end-effectors with real-time force-controlled manipulation to avoid damage. Learned disassembly strategies accommodate variable component conditions and connection types. Detached parts are managed via vision-verified robotic storage bins or secure holding areas to prevent misplacement or damage.

For Exterior Lighting (e.g., underglow or functional lights):

This may require temporarily removing or repositioning underbody shields, splash guards, bumper covers, grilles, or wheel well liners impeding access. Specialized tools (e.g., tool 110 in FIG. 1) and adaptive force control enable safe removal and storage, ensuring damage-free reinstallation. The robotic platform's postural adaptability (e.g., crawling, kneeling) or precise positioning (e.g., gantry robot) facilitates access, even on uneven outdoor surfaces or in confined spaces.

For Headlight/Taillight Servicing:

The system precisely disengages mounting clips, bolts, and electrical connectors to safely remove assemblies.

Additionally, the system includes mechanisms for responsible disposal or recycling of cleaning agents or contaminated water generated during cleaning/preparation, compliant with environmental regulations and best practices.

Precision Lighting Component Installation, Repair, and Securing

Utilizing the high-resolution 3D scan and a pre-programmed or user-defined lighting pattern or task, the AI control module (306) generates an optimal placement map or operational sequence for each lighting component or servicing step.

Interior Lighting (e.g., starlight):

The robotic arm (part of robot 102 in FIG. 1) drills or punches precise holes in the headliner and inserts fiber optic strands with continuous tactile feedback. Optimal insertion depth is adjusted for aesthetic variation. An automated adhesive applicator controls adhesive flow and temperature precisely to secure each fiber.

Exterior Aesthetic Lighting (e.g., underglow):

The AI control module determines exact routing paths, attachment points, and connection locations, avoiding underbody components such as exhaust and drivetrain. The robotic platform cleans and prepares surfaces, applies adhesives or fastening devices (clips, screws) to securely affix components, adapting posture for optimal access. This correlates with the general "Film or Coating Application" process (214 in FIG. 2), adapted for lighting.

Functional Lighting (e.g., headlight/taillight servicing):

The module directs precise sequences for replacement, repair, or restoration:

Replacement: Aligns and secures new assemblies, ensuring correct light output and reattaching electrical/sealing components.

Repair/Restoration: Polishes hazy lenses using multi-stage buffing with consistent pressure/speed, avoiding paint damage. Performs precise component adjustments or part swaps.

Automated Wiring and Connection

The system autonomously routes and secures lighting bundles and electrical wiring (Automated Wiring & Connection 408 in FIG. 4).

Fiber optic bundles for interior lighting are routed through concealed pathways to the light engine location.

For exterior aesthetic and functional lighting, wiring is secured to protect against environment, mechanical stress, and heat.

Automated connection to power sources is performed, typically integrating via fuse taps to existing vehicle circuits (interior lights, radio, auxiliary outlets), adhering to automotive wiring standards.

The system features intelligent power management algorithms, especially for mobile units, managing battery usage and power sources such as:

Integrated LiFePO4 battery packs

Mobile generators

Vehicle 12V supply via smart inverter

External shore power at customer locations

Power management dynamically monitors consumption, predicts task duration, switches sources autonomously, and requests human intervention for recharging, maximizing uptime. Large fleet operations use centralized monitoring for battery states, predictive maintenance, optimized routing to charging hubs or battery swap stations, and support autonomous or coordinated human-robot recharging/swapping.

Quality Assurance and Post-Installation/Service Verification

Integrated high-resolution vision systems perform real-time quality checks during and after installation/servicing (Quality Assurance & Post-Installation Verification 410 in FIG. 4; Defects Detected 216 and AI Initiates Corrective Action 218 in FIG. 2).

Checks include:

Placement accuracy of each lighting component

Brightness uniformity and aesthetic consistency

Wire routing and secure electrical connections

Beam alignment for functional lights

Operational lighting pattern and intensity tests

Functional checks verify LEDs' operational status, color correctness, brightness, power consumption, and correct alignment. Complete documentation of installation/servicing—including pre/post scans, quality metrics, and anomalies—is automatically logged for quality control and AI model refinement, closing the continuous learning feedback loop.

After verification, the robotic platform autonomously reassembles disassembled components securely and without damage. The system incorporates advanced diagnostics via vehicle-specific data (e.g., OBD-II port, OEM APIs) to verify electrical integration and functional status, providing automated troubleshooting guidance for human supervisors.

Advanced Capabilities

AutoWrap LED Robotics distinguishes itself through advanced features enabling high performance and adaptability across complex interior and exterior automotive environments, including uncontrolled on-site/mobile deployments.

Dexterity and Adaptive Manipulation in Confined and Challenging Access Areas

Robotic platforms are designed for high dexterity and effective operation within confined, human-centric spaces typical of vehicle interiors, adapting locomotion or positioning to access difficult areas such as vehicle underbodies or functional lighting bays, even on uneven surfaces or varied layouts (garages, mobile units).

Humanoid robots (e.g., robot 102 in FIG. 1) with advanced multi-degree-of-freedom (DoF) hands (e.g., hands 106 with 16 DoF each, FIG. 2) enable intricate manipulations.

Mobile platforms offer flexible reach; gantry robots provide stable overhead access.

Such adaptability addresses tasks previously feasible only by human hands, offering significant competitive advantage. The system leverages imitation learning with coarse-to-fine trajectory planning for fine manipulation, enabling rapid adaptation to new patterns, vehicle models, or environmental conditions without extensive reprogramming.

Adaptive Learning and Real-Time Decision-Making

Details on the AI Control Module (306), including adaptive learning paradigms (imitation learning, reinforcement learning, generative AI), proprietary data integration, real-time decision-making, autonomous navigation, on-device AI, integration architecture, and cyber-physical security measures, are thoroughly described herein. For brevity and to avoid redundancy, readers are referred to that section for full understanding.

Force Control for Delicate Component Handling

The implementation of impedance control and a robust force control architecture is fundamental to AutoWrap LED Robotics' ability to safely and compliantly interact with delicate vehicle components—such as headliner fabric, plastic trim, and fragile fiber optics—as well as more rugged yet sensitive vehicle underbody elements like LED strips, wiring, chassis parts, and precise headlight/taillight mounting points. This ensures zero damage during installation or servicing.

By continuously measuring forces exerted on the robotic end-effector and dynamically adjusting movements, the system mimics biological compliance and resilience. The robotic platform absorbs impacts, adapts to unexpected forces, and maintains a gentle yet firm grip, critical for delicate materials and precise fittings. Regulating the force-motion relationship guarantees stable contact and prevents excessive force application.

Without such precise, responsive force control, automating these delicate tasks would be economically unfeasible due to scrap, rework, or damage risk. This capability enables applying only necessary force during insertion, attachment, wiring, and servicing, preserving material integrity.

Moreover, this force control allows safe human-robot shared workspaces by responding compliantly to contact or proximity. It ensures robust performance and safety despite environmental disturbances common in mobile or on-site contexts.

Overall, this capability delivers not only efficiency but also the flawless finish and material integrity expected in high-end vehicles and critical repairs, directly supporting the system's value proposition.

Human-Robot Collaboration and Safety Protocols

AutoWrap LED Robotics is explicitly designed for safe, effective human-robot collaboration, enabling operation alongside human workers both on factory floors and in dynamic, less controlled on-site or mobile environments.

This collaborative approach reduces ergonomic injuries from repetitive stress, heavy lifting, or awkward postures (such as accessing underbody or headlight/taillight areas), improving workplace safety and allowing human workers to focus on higher-value cognitive tasks.

While automation often raises job displacement concerns, evidence shows robotic platforms enhance team productivity and reduce ergonomic injuries. Automakers like Mercedes-Benz explore such robotics to support skilled labor and fill gaps in low-skill, repetitive, or physically demanding work.

By automating physically demanding, repetitive, and intricate tasks-such as starlight and underglow installation and functional lighting servicing-AutoWrap LED Robotics frees humans to focus on supervisory roles, complex problem-solving, quality oversight, or other tasks requiring judgment and creativity. This reframes automation as job enhancement and optimization rather than replacement, aiding adoption and workforce acceptance.

In less controlled outdoor environments, human-robot interaction is defined as seamless "team mate collaboration," including:

Setup and Initial Deployment: Humans safely position the mobile unit and robot, verify safety zones, confirm power connections, and may teleoperate or mark target areas for initial alignment.

Specialized Human Dexterity Tasks: Highly specialized or rare vehicle modifications may require human dexterity (e.g., final artistic starlight adjustment, handling delicate trim), while robots assist with preparation and heavy lifting-optimizing resource allocation.

Figure 5:
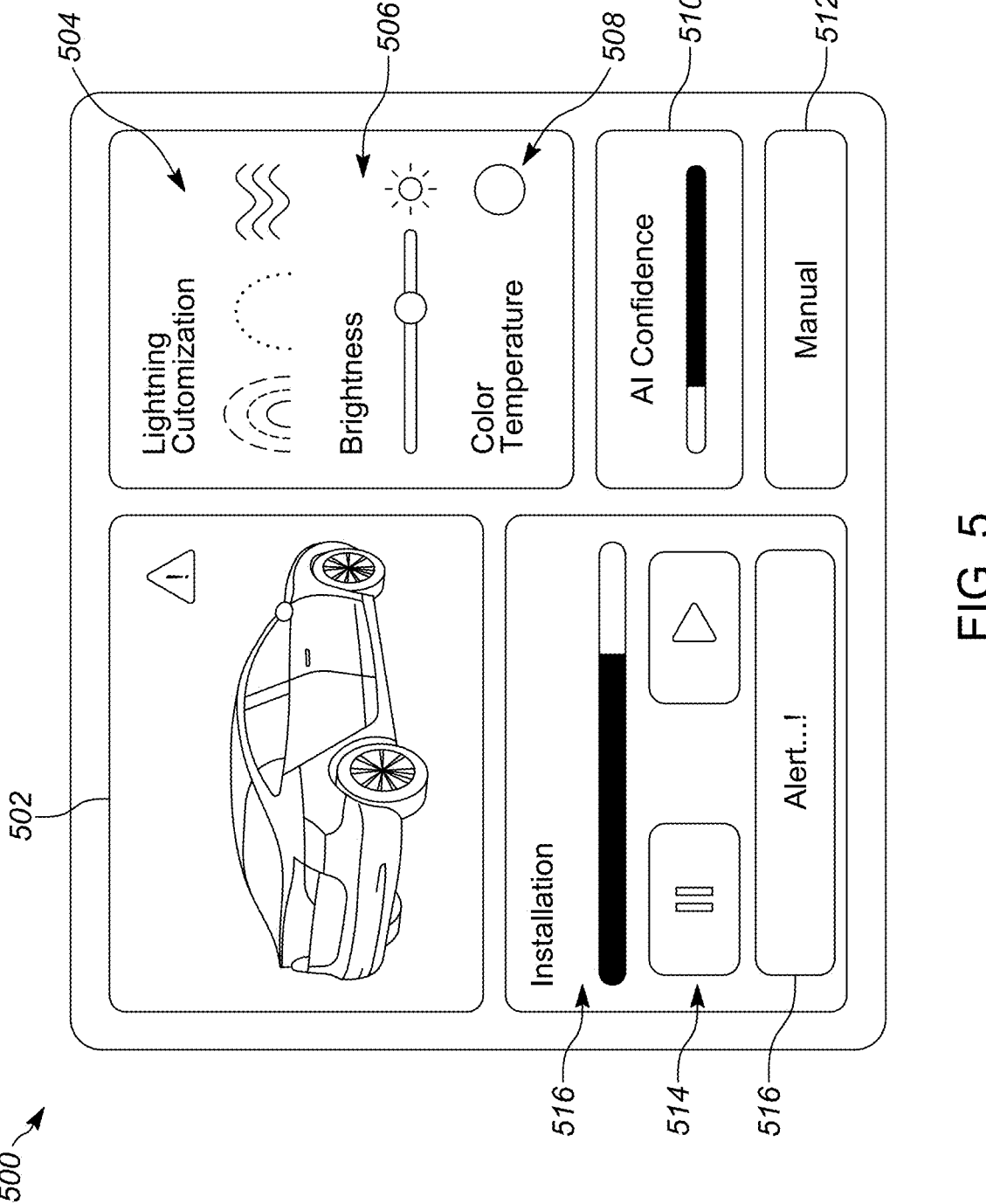
FIG. 5 depicts a user interface (500) for controlling and monitoring the system. It features a section for Lighting Customization (504, 72) with adjustable Brightness (506, 74) and Color Temperature (508, 76). The interface also displays an AI Confidence (510, 85) meter and a Manual (512, 87) control option. An Installation progress bar (516, 77, 78) with controls (514, 79, 80) and an Alert . . . ! (516, 81, 82) section are also present. A visual representation of a vehicle (502, 71) is central to the interface. This figure highlights the interactive control and monitoring capabilities of the system for users, allowing remote oversight of operations whether at a fixed facility or a mobile service unit.

Problem-Solving and Anomaly Handling: Humans oversee via user interface (FIG. 5) for complex anomalies, providing verbal or gestural guidance or manual overrides for tasks beyond current robotic learning (e.g., intricate wiring repairs, bespoke aesthetic tweaks). Diagnostic outputs assist human troubleshooting.

Material Resupply and Tool Maintenance: Humans manage consumables (fiber optic spools, adhesives, LED strips) and perform higher-level maintenance informed by automated tool management.

Robust safety protocols include real-time human detection and safety-rated monitored stops (SRMS) compliant with standards like ISO/TS 15066. These mechanisms adapt dynamically to less controlled environments (driveways, parking lots, public spaces) to protect bystanders, occupants, and property, adjusting safety perimeters via environmental sensing.

BEST MODE FOR CARRYING OUT THE INVENTION

The inventor contemplates the best mode as described herein, comprising:

Use of various robotic platforms, including commercially available humanoid robots (Apptronik Apollo, Agility Robotics Digit, Figure AI Figure 02, Tesla Optimus), gantry, and mobile robots.

Integration with AI software control using machine learning, including novel imitation learning algorithms with coarse-to-fine trajectory planning and reinforcement learning with task-specific rewards.

Advanced multi-modal sensing: 3D LiDAR, tactile, force/torque sensors with active sensing in end-effectors and dynamic lighting compensation.

Specialized, interchangeable end-effectors with autonomous quick-change and automated tool management/maintenance.

AI algorithms handle scan processing, planning, and real-time control. Detailed operational procedures cover interior/exterior lighting installation and functional lighting servicing—including autonomous disassembly, repair, replacement, and reassembly. Demonstrated robust operation spans fixed facilities and mobile/on-site deployments, often completing services within six hours or same-day via multi-robot and human-robot collaboration.

System architecture encompasses data security, environmental resilience, power management for mobile use, and fleet management—all integral to the best mode.

The invention claimed is:

1. A computer-implemented artificial intelligence (AI) software control system for autonomously performing adaptive vehicle lighting installation and servicing, the system comprising:
   a. a sensing module configured to generate a three-dimensional digital model of a vehicle's interior and/or exterior surfaces and structures at diverse operational locations, including fixed facilities and mobile or on-site customer premises;
   b. an AI control module configured to:
      i. process said three-dimensional digital model to generate an installation and/or servicing plan for lighting components based on a desired lighting pattern or a diagnostic or repair task, said processing including dynamically adapting to environmental conditions of said operational locations, said adaptation including compensation for variable ambient lighting, temperature fluctuations, and ground irregularities;
      ii. learn and adapt robotic manipulation sequences for delicate tasks from expert demonstrations or operational feedback, said learning including the utilization of synthetically generated high-fidelity training data via generative AI and a closed-loop feedback mechanism for continuous model refinement; and
      iii. generate real-time control commands, said commands adapting to real-time sensor feedback and environmental variations encountered at said operational locations; and
   c. a controller operatively coupled to one or more robotic actuators configured to control at least one robotic platform to:
      i. execute said installation and/or servicing plan by manipulating said vehicle and said lighting components;
      ii. perform precision placement, repair, or replacement of said lighting components using specialized end-effectors with integrated active sensing and controlled force application, said force application maintaining material integrity for delicate vehicle components associated with headliner fabric, plastic trim, or wiring harnesses; and
      iii. respond to said real-time control commands from said AI control module.

2. The system of claim 1, wherein the at least one robotic platform includes a humanoid robot, a gantry robot, and/or a mobile robot, configured for operation in both fixed and mobile deployment scenarios.

3. The system of claim 1, wherein the AI control module's learning and adaptation includes machine learning, natural language processing, generative AI including high-fidelity synthetic data generation, imitation learning, and reinforcement learning.

4. The system of claim 1, wherein the controller is configured to control the at least one robotic platform to autonomously select and operate a variety of interchangeable end-effectors, including at least one of: adhesive applicators, fastening devices, fiber optic manipulators, trim removal tools, wiring tools, or polishing or buffing tools for lens restoration, said selection enabled by a modular change mechanism with automated tool management and maintenance.

5. The system of claim 1, further comprising integrated sensors on the at least one robotic platform configured to monitor lighting component placement, tension, LED alignment, beam pattern, and wiring integrity during installation and servicing, and to enable real-time quality assurance and corrective actions, said quality assurance data feeding back into the AI control module for continuous learning and predictive maintenance insights.

6. The system of claim 1, wherein the AI control module is configured to operate autonomously without continuous internet connectivity through the use of on-device AI models, enabling robust mobile and on-site deployments.

7. The system of claim 1, further comprising a user interface for remote monitoring, lighting customization, and supervisory control with human override capability, said user interface supporting intuitive control, detailed error handling, and customization workflow, wherein a user can select a specific aesthetic lighting pattern from said user interface, prompting the AI control module to generate a corresponding robotic installation plan incorporating unique placement and wiring sequences, said system further configured to wirelessly synchronize the installed or serviced lighting with vehicle infotainment and ambient control systems, and allow remote oversight of operations at mobile or on-site locations.

8. The system of claim 1, further comprising an intelligent power management system for mobile deployments, configured to optimize energy consumption and utilize auxiliary power sources for sustained operation.

9. The system of claim 1, wherein the robotic platform and its components are designed for environmental robustness, including resistance to temperature extremes, moisture, dust, and wind, for reliable outdoor and mobile operations.

10. The system of claim 1, further comprising a fleet management system for centralized monitoring, software updates, diagnostic reporting, and task assignment across multiple deployed robotic units, wherein said fleet management system enables over-the-air deployment of updated AI models and software patches to a plurality of robotic units, facilitating rapid integration of new vehicle models and lighting patterns.

11. The system of claim 1, further comprising a data security and privacy module configured to secure sensitive vehicle data, ensure data privacy during on-site operations, and protect the integrity of AI models by performing real-time anonymization of personally identifiable information (PII) within scanned data and encrypting all data transmissions and storage.

12. A computer-implemented method for autonomously performing adaptive vehicle lighting installation and servicing using at least one robotic platform, the method comprising:
   a. obtaining a three-dimensional digital model of a vehicle's interior and/or exterior surfaces and structures using a vision system, said obtaining occurring at diverse operational locations, including fixed facilities and mobile or on-site customer premises, said vision system dynamically compensating for variable ambient lighting conditions;

b. processing said three-dimensional digital model via an AI control system to generate an installation and/or servicing plan for lighting components based on a desired lighting pattern or a diagnostic or repair task, said processing including dynamically adapting to environmental conditions of said operational locations;

c. instructing said at least one robotic platform, via said AI control system, to autonomously transport itself and/or its associated mobile service unit to a specified vehicle location and manipulate and prepare said vehicle for lighting installation and/or servicing, including dynamically adapting its posture or position to access installation areas regardless of environmental constraints, and managing power supply from integrated or auxiliary sources for sustained operation;

d. instructing said at least one robotic platform to autonomously install, repair, or replace said lighting components into said vehicle according to said installation and/or servicing plan, utilizing precision robotic manipulation and tactile feedback from specialized end-effectors with integrated active sensing, said specialized end-effectors being autonomously selected and maintained via a change and automated tool management mechanism;

e. instructing said at least one robotic platform to autonomously route and connect associated wiring for said lighting components, and to interface with vehicle diagnostic systems for functional verification; and f. performing real-time quality control and corrective adjustments of said installation and/or servicing using robot-integrated sensors and said AI control system, said quality control findings automatically updating machine learning models for continuous improvement, thereby enabling completion of services within six hours or same-day completion through multi-robot or human-robot collaboration, with integrated error handling and remote troubleshooting capabilities, including autonomous recovery from unexpected obstructions or minor tool malfunctions.

13. The method of claim 12, wherein the at least one robotic platform includes a humanoid robot, a gantry robot, and/or a mobile robot, configured for operation in both fixed and mobile deployment scenarios.

14. The method of claim 12, wherein obtaining said three-dimensional digital model includes scanning a vehicle interior roof for starlight installation, a vehicle underbody for underglow installation, and/or vehicle front or rear fascias for functional lighting servicing, said scanning occurring in a fixed facility or at an on-site customer location, with dynamic lighting compensation.

15. The method of claim 12, wherein installing, repairing, or replacing said lighting components includes performing precision insertion of fiber optic strands into a headliner, securely attaching LED strips to vehicle underbody structures, and/or precise removal, replacement, or restoration of headlight or taillight assemblies, with the robotic platform dynamically adapting to real-time environmental feedback and utilizing comprehensive vehicle-specific data.

* * * * *